Feb. 24, 1953     F. O. CARLSON     2,629,180
RULER CONSTRUCTION
Filed Jan. 23, 1951

INVENTOR.
FRED O. CARLSON
BY Curtis, Morris & Safford
ATTORNEYS.

Patented Feb. 24, 1953

2,629,180

UNITED STATES PATENT OFFICE 2,629,180

RULER CONSTRUCTION

Fred O. Carlson, Monrovia, Calif., assignor to Carlson & Sullivan, Inc., Monrovia, Calif., a corporation of California Application January 23, 1951, Serial No. 207,397

3 Claims. (Cl. 33—137)

This invention relates to ruler constructions. More particularly it pertains to a ruler and construction whereby the end of the ruler which forms the datum for the measuring indications may be precisely positioned flush with a surface from which a distance is to be measured. Where the measurement to be taken is from an inner surface, such as distance along a floor from a wall, where the ruler end is pushed into abutment with the surface of the wall, the measurement is said to be an "inside" measurement. Where the measurement to be taken is from an outer surface, such as distance along the top of a desk from an edge thereof, the measurement is said to be an "outside" measurement. My invention concerns a novel and commercially practicable inside-outside ruler which is both durable and foolproof in operation.

Heretofore several arrangements have been suggested for providing a hook on the end of a ruler such that the ruler end may readily be hooked flush with an edge from which an outside measurement is to be made. In some of these arrangements the inside face of the hook, toward the length of the ruler, is located precisely even with the datum end of the ruler. It is obvious that such a hook will extend beyond the end of the ruler in the direction of its length at least by the thickness of the material which forms the hook. Accordingly, the end of the ruler cannot be abutted directly against a surface from which an inside measurement is to be taken because the hook will necessarily space the datum end of the ruler from the surface by an amount equal to the hook thickness.

In one construction of the prior art the hook has been slidably connected to the end of the ruler so that its outside face may be made flush with the ruler end when the ruler end is to be abutted against a surface and so that the inside face toward the ruler may be made flush with the end of the ruler when the ruler is tensioned against the hook to measure distance from a surface in contact with the inside face of the hook. In another construction a shaped piece has been pivoted or slidably riveted flat against the end of the ruler with one position for inside measurements and another position for outside measurements. Such past pivot and compound slide arrangements have involved relatively complicated rivet and slot configurations which tended to become inaccurate with use and which were not such as could be cheaply mass produced. Another expedient which has been tried included a dihedrally shaped piece pivoted about a transverse axis approximately coinciding with the end of the ruler, whereby one of the dihedral faces is used for inside measurements and the other is used for outside measurements. In addition it has been proposed to put two rows of graduations on the ruler, one for inside measurements and one for outside measurements.

These various constructions have performed to a certain extent their intended functions but they have been relatively expensive to manufacture, have not been foolproof in operation and some of them have had an inherent tendency to lose adjustment and become inaccurate. Further, some of them have suffered the disadvantage that where they were present it was impossible to bring the first few inches of the ruler into face to face contact with the surface being measured because the end of the ruler would always be raised from the surface by some projecting piece; this factor sometimes has introduced inaccuracies into the measurements taken and has rendered the ruler useless as a guide for drawing straight lines. I have devised a construction whereby the end of a ruler may be hooked to an edge and held under tension for making an outside measurement and whereby it may be abutted squarely against a surface for making an inside measurement. Additionally, a ruler embodying my invention may be used without any hook at all to perform all the functions of a ruler having a plain end. And my construction is simple to manufacture and use and it cannot lose its accuracy.

It is an object of my invention to provide a ruler construction of the character described having to a notable extent the characteristics and capabilities above set forth. A further objective is the provision of an assembly of parts at the datum end of a ruler whereby inside and outside measurements may be directly taken and wherein the assembly is simple to manufacture and use and will have a long life. Another object is to provide a construction wherein a hook on the datum end of the ruler may be accurately located either turned up or turned down or, if desired, removed entirely to leave the ruler end unencumbered. A further objective resides in the provision of a ruler construction which overcomes certain of the disadvantages inherent in the constructions of the prior art. Other objects will be in part pointed out as the description proceeds and will in part become apparent therefrom.

The invention accordingly consists in the features of construction, combinations of elements, arrangements of parts and methods of operations as will be exemplified in the structures and sequences and series of steps to be hereinafter indicated and the scope of the application of which will be set forth in the claims.

In this specification and the accompanying drawings, I have shown and described a preferred embodiment of my invention and suggested various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

Figure 4:
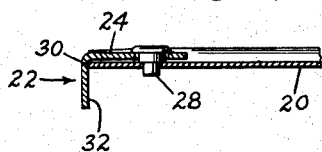
Figure 4 is a sectional view on an enlarged scale through the end of the ruler construction showing an intermediate step in assembling the parts.
Figure 1:
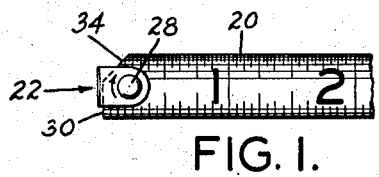
Figure 1 is a plan view of an end portion of a ruler embodying my invention.
Figure 2:
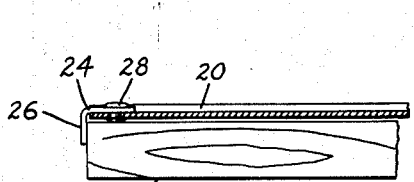
Figure 2 is a sectional view taken through the ruler portion of Figure 1 showing the parts in position for making an outside measurement.

In Figures 1 and 2 a ruler 20 is indicated provided with a tip piece 22 combining a flat shank portion 24 juxtaposed in face to face relationship with the end of the ruler (see Figure 2) and a flat hook-forming projection 28 at a right angle to shank portion 24. In the present embodiment piece 22 is stamped from sheet metal. The piece is pivotally secured to the ruler by means of a shoulder rivet 28 as shown in Figure 4. The pivot point for rivet 28 is located in the longitudinal center of the ruler, equally spaced from each side edge. Thus any pull on the ruler against the hook-forming projection is evenly balanced and there is no tendency for the ruler to twist.

Figure 6:
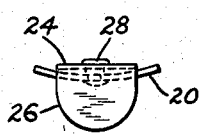
Figure 6 is an end view on an enlarged scale of the construction.
Figure 5:
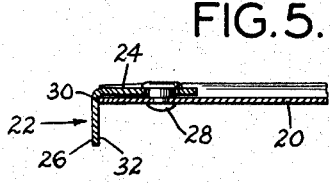
Figure 5 is a view similar to that of Figure 4 showing the finished assembly.

The length of the stem of rivet 28, from beneath its head to the edge of its shoulder, is slightly greater than the thickness of shank 24. As shown in Figure 5 rivet 28 is solidly set in ruler 20 so that in effect it forms an integral part thereof. In the embodiment shown ruler 20 is of the steel concavo-convex type (see Figure 6) so that it acts as a spring washer to hold piece 22 resiliently against the under surface of the rivet head and away from the trough of the concave side of the ruler. Thus, even though the length of the rivet stem is greater than the thickness of shank 24, the spring-like characteristics of the ruler hold piece 22 yieldably against the rivet head so that the piece will not rattle about the rivet and will tend to stay by friction in whatever position it finds itself.

The steel from which ordinary concavo-convex rulers are made is extremely hard. For ease of manufacture any rivet which is to be set must be materially softer than the thin steel stock of the ruler. Hence relative movement between rivet and ruler should be eliminated insofar as possible in order to prevent the rivet from being cut through by the edge of the ruler. In some instances it may be desirable to make the rivet hole in the ruler of a noncircular shape so that the set rivet will further resist rotation with respect to the ruler.

Figure 3:
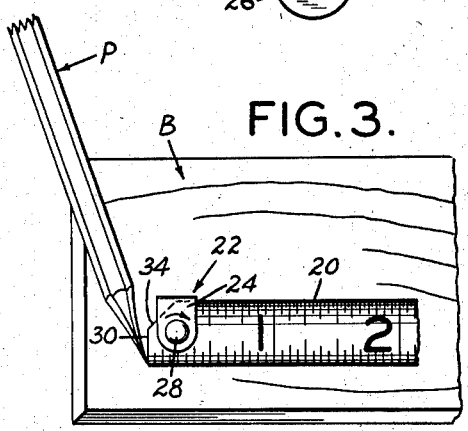
Figure 3 is a view similar to that of Figure 1 but showing the parts positioned so as to leave the datum end of the ruler exposed either for making an inside measurement or to serve as a guide while making a mark with a pencil.

The datum end 30 of ruler 20 is trimmed off even with the zero indication and is precisely flush with the inside face 32 (see Figures 4 and 5) of projection 26. Accordingly, when the projection is positioned against a surface such as the edge of the board indicated at "B" in Figure 2, the ruler may be held as shown under tension against projection 26 and the indicia of the ruler will provide accurate and direct readings along its length. Because piece 22 is centered on the end of the ruler the tensioning of the ruler does not have any torsional effect and the ruler remains flat and easy to read. The end of the ruler is relieved as at 34 (see Figures 1 and 3) whereby piece 22 may be swung from the relationship illustrated in Figures 1 to that shown in Figure 3, thus exposing completely the datum end of the ruler so that an inside measurement may be taken or so that the edge may form a guide for making a pencil mark as indicated by pencil P in Figure 3. The single series of graduations remain exposed and easy to read in any angular position of piece 22 (see Figures 1 and 3).

Figure 7:
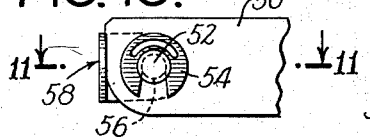
Figure 7 is a view showing the end portion of the ruler lying along and in contact with a flat surface.

Most rulers of the concavo-convex type are normally carried in a coil in a pocket size case. My pivot piece 22 acts as a stop to prevent any possibility of the end of the ruler snapping into the inside of the carrying case where it cannot be reached. This is true whatever the angular position of the pivot piece on the end of the ruler. Thus my construction adds another function which was lacking from some of the prior art constructions. Furthermore, as shown in Figure 7, the pivot piece is so disposed that the first few inches of the ruler may be brought into continuous contact along a surface, either for greater ease and accuracy of measurement or for drawing a line along the ruler edge. In the embodiment shown the angle A is on the order of 25°.

Figure 8:
Figure 8 is a view similar to that of Figure 4 but showing another embodiment of the invention.

Figure 8 illustrates another embodiment of the invention. Here the separate rivet has been eliminated and instead tip piece 36 is pivoted to ruler 38 by an eyelet-like rivet portion 40 drawn from the body of piece 36 through the hole in the ruler and into engagement with the opposite face of the ruler. As before, the ruler acts inherently as a spring washer to tend to retain the tip piece in any given angular relationship upon the end of the ruler.

Figure 9:
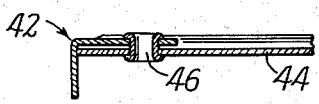
Figure 9 is a view similar to that of Figure 8 but showing still another embodiment of the invention.

Figure 9 illustrates a further embodiment of the invention wherein tip piece 42 is pivoted to ruler 44 by an eyelet 46. Here again, the ruler acts inherently as a spring washer to tend to retain the tip piece in any given angular relationship upon the end of the ruler. From a practical standpoint the eyelet construction of Figure 9 probably represents a particularly desirable embodiment because eyelets are made to closer mechanical limits than can be obtained either in a headed rivet (Figure 4) or a protruded metal fastening (Figure 8). Additionally, eyelets may be obtained in relatively hard metals as compared to the metals commonly found in rivets of the type illustrated by rivet 28. Thus eyelet 46 can satisfactorily survive any metal-to-metal abrasion or cutting which may tend to result from repeated swinging movement of piece 42 with respect to ruler 44.

Figures 10, 11:
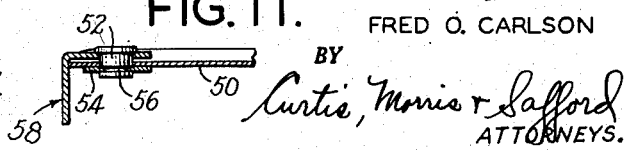
Figure 10 is a view similar to that of Figure 1 but taken from below and showing another embodiment of the invention.
Figure 11 is a sectional view taken along the line 11—11 of Figure 10.

The embodiment of Figures 10 and 11 is one in which tip piece 58 may be turned either downwardly (see Figure 10), upwardly (not shown), or entirely removed from ruler 50 so as to leave the datum end of the ruler wholly unencumbered. Thus, the ruler may be used as an ordinary straight edge flat against a drawing on a board or it may, for example, be pushed into a narrow slot or crack in order to measure depth. Tip piece 58 is removably secured to ruler 50 by a rivet 52 and spring retainer 54 snapped into an annular groove 56 running around the end of the rivet. The assembled rivet and retainer of this embodiment function as do the rivets and eyelets of the previously-described embodiments so that the inherent resilience of the ruler itself acts as a spring washer to hold the tip piece frictionally in any desired angular position. The shank of rivet 52 fits nicely through the holes in tip piece 58 and ruler 50 and so no inaccuracy or looseness results. It is a simple matter to spring apart the legs of the spring retainer and remove it from engagement in groove 56. Thereafter the rivet may be readily withdrawn and the tip piece reversed, or removed entirely, depending upon the use to which the ruler is next to be put.

From the foregoing it will be seen that a ruler construction made in accordance with the present invention is well adapted to attain the ends and objects hereinbefore set forth and to be economically manufactured, since the entire mechanism is suited to common production methods and is susceptible of a wide latitude of variations as may be desirable in adapting the invention to different applications.

As various embodiments may be made of the above invention and as changes might be made in the embodiments above set forth, it is to be understood that all matter hereinbefore set forth or shown in the accompanying drawings is to be interpreted as illustrative and not in a limiting sense.

I claim:

1. An inside-outside measuring construction of the type wherein means is provided for holding the end of a tensioned ruler flush with a surface from which an outside measurement is to be taken, and wherein the end of the ruler may be pushed into abutment flush against a surface from which an inside measurement is to be taken, said construction including: a ruler portion of the spring steel concavo-convex type having a datum end from which graduations along the ruler are numbered, and a tip piece lying partly juxtaposed in overlapping face to face relationship with the concave side of said ruler and including an abutment-forming projection extending approximately perpendicularly from said juxtaposed part of said tip piece; said ruler portion and tip piece being pivotally secured together with the juxtaposed part of the tip piece drawn nearly flat against the concavely biased ruler portion, whereby the ruler portion acts as a spring washer for yieldably holding the tip piece in whatever pivotal relationship it finds itself, the maximum length of the juxtaposed part of the tip piece as measured from said projection along a line parallel to said face to face relationship and passing through that point of the juxtaposed part most remote from said projection being less than the width of the ruler, whereby when the tip piece is moved to that pivotal relationship wherein its dimension of said maximum length is transverse with respect to the ruler the tip piece is not long enough to extend entirely across the ruler, said datum end embodying a vertical transverse edge defining a rectangular corner with the lower edge of the ruler portion, said datum end embodying a relieved corner region at the upper edge of the ruler portion, said graduations running along the lower edge of the ruler portion from said vertical transverse edge, and said relieved corner region providing clearance for pivoting said tip piece through 90° from a position wherein said projection extends from said vertical transverse edge to a position wherein said tip piece is transverse with respect to the ruler, whereby when said tip piece is transverse the lower edge of said ruler is unobstructed by said tip piece and may be used as a pencil guide line all the way to said rectangular corner.

2. An inside-outside measuring construction of the type wherein means is provided for holding the end of a tensioned ruler flush with a surface from which an outside measurement is to be taken, and wherein the end of the ruler may be pushed into abutment flush against a surface from which an inside measurement is to be taken, said construction including: a ruler portion of the spring steel concavo-convex type having a datum end from which graduations along the ruler are numbered, a tip piece lying partly juxtaposed in overlapping face to face relationship with the concave side of said ruler and including an abutment forming projection extending approximately perpendicularly from said juxtaposed part of said tip piece, said datum end embodying a vertical transverse edge defining a rectangular corner with the lower edge of the ruler portion, said datum end embodying a relieved corner region at the upper edge of the ruler portion, said graduations running along the lower edge of the ruler portion from said vertical transverse edge, and said relieved corner region providing clearance for pivoting said tip piece through 90° from a position wherein said projection extends from said vertical transverse edge to a position wherein said tip piece is transverse with respect to the ruler, whereby when said tip piece is transverse the lower edge of said ruler is unobstructed by said tip piece and may be used as a pencil guide line all the way to said rectangular corner, and a rivet arrangement pivotally securing said tip piece and ruler portion together with the juxtaposed part of the tip piece drawn nearly flat against the concavely biased ruler portion, whereby the ruler portion acts as a spring washer for yieldably holding the tip piece in whatever pivotal relationship it finds itself, said rivet arrangement including a headed rivet with an annular groove running around its shank adjacent its end and a spring retainer yieldably seated in said groove, whereby the tip piece may be removed by unseating said retainer and withdrawing said rivet.

3. An inside-outside measuring construction of the type wherein means is provided for holding the end of a tensioned ruler flush with a surface from which an outside measurement is to be taken, and wherein the end of the ruler may be pushed into abutment flush against a surface from which an inside measurement is to be taken, said construction including: a ruler portion of the spring steel concavo-convex type having a datum end from which graduations along the ruler are numbered, a tip piece lying partly juxtaposed in overlapping face to face relationship with the concave side of said ruler and including an abutment-forming projection extending approximately perpendicularly from said juxtaposed part of said tip piece, a rivet arrangement pivotally securing said tip piece and ruler portion together with the juxtaposed part of the tip piece drawn nearly flat against the concavely biased ruler portion, whereby the ruler portion acts as a spring washer for yieldably holding the tip piece in whatever pivotal relationship it finds itself, said rivet arrangement including a headed rivet with an annular groove running around its shank adjacent its end and a spring retainer yieldably seated in said groove, whereby the tip piece may be removed by unseating said retainer and withdrawing said rivet, the maximum length of the juxtaposed part of the tip piece as measured from said projection along a line parallel to said face to face relationship and passing through that point of the juxtaposed part most remote from said projection being less than the width of the ruler, whereby when the tip piece is moved to that pivotal relationship wherein its dimension of said maximum length is transverse with respect to the ruler the tip piece is not long enough to extend entirely across the ruler, said datum end embodying a vertical transverse edge defining a rectangular corner with the lower edge of the ruler portion, said datum end embodying a relieved corner region at the upper edge of the ruler portion, said graduations running along the lower edge of the ruler portion from said vertical transverse edge, and said relieved corner region providing clearance for pivoting said tip piece through 90° from a position wherein said projection extends from said vertical transverse edge to a position wherein said tip piece is transverse with respect to the ruler, whereby when said tip piece is transverse the lower edge of said ruler is unobstructed by said tip piece and may be used as a pencil guide line all the way to said rectangular corner.

FRED O. CARLSON.

REFERENCES CITED

The following references are of record in the file of this patent:

UNITED STATES PATENTS

| Number | Name | Date |
|---|---|---|
| 1,186,853 | Smith | June 13, 1916 |
| 1,915,640 | Alsaker | June 27, 1933 |
| 1,986,551 | Anderson | Jan. 1, 1935 |
| 2,025,848 | Collis | Dec. 31, 1935 |